Patented Aug. 22, 1933

1,923,932

UNITED STATES PATENT OFFICE 1,923,932

VULCANIZATION OF RUBBER AND RUBBER-LIKE SUBSTANCES

Maldwyn Jones, Crumpsall, and William Johnson Smith Naunton, Prestwich, England, assignors to Imperial Chemical Industries Limited, a Corporation of Great Britain No Drawing. Application October 28, 1931, Serial No. 571,676, and in Great Britain November 28, 1930.

20 Claims. (Cl. 18—53)

This invention relates to the vulcanization of rubber goods and particularly to the vulcanization of rubber goods with accelerators which possess a tendency to scorch the rubber during the milling. Scorching is the premature vulcanization brought about by local overheating in the mechanical treatment of the rubber as in the milling thereof, the tendency to scorch being dependent largely on the nature of the accelerator. For example, the 2-mercapto-arylenethiazoles, such as 2-mercapto-benzthiazole, are well-known accelerators which possess many advantages but which suffer from the defect of being very liable to cause scorching. Efforts have been made to overcome to some extent this defect by using various derivatives of the accelerating compounds, but most of the derivatives operate largely as diluents of the accelerator and operate to diminish the accelerating compound of the accelerator.

Our invention has for one of its objects the elimination of this disadvantageous property of scorching, while at the same time permitting the accelerator to operate to its fullest extent in the vulcanization of the rubber. Other objects will be apparent as our description proceeds.

According to our invention we incorporate with rubber, and by rubber we wish to include the various modifications and substitutes of rubber and synthetic rubbers, either before or during the milling operations, a condensation product of the kind commonly known as a "glyptal". "Glyptals" are polyhydric-alcohol-polybasic acid condensation products, and in general of the "glyptals" we prefer those which possess an acid reaction. The polyhydric alcohol-polybasic-acid condensation products contemplated by our invention are obtained by the inter-action of an aromatic dibasic acid, such as phthalic acid or phthalic anhydride with a polyhydric alcohol, such as glycerol. The reactants may contain other substituents or other radicals such as those of the fatty acids. In general we contemplate all bodies of the general class of "glyptals" provided the bodies have acid functions unsatisfied and preferably have an acid value of 30 or above.

In carrying our invention into practical effect we add the acid polyhydric-alcohol-polybasic-acid condensation product to the rubber mix preferably during milling, and our invention is illustrated by the following example, it being understood that the reactants and amounts thereof and conditions of operation are given by way of illustration and not by way of limitation:

Example I

To a rubber mix consisting of smoked crepe rubber 100 parts, zinc oxide 10 parts, barytes 75 parts, sulphur 2.5 parts, and the accelerator comprising the reaction product of dinitrochlorobenzene and mercapto benzothiazole disclosed in British Patent 316,932. 0.5 parts, 0.5 parts of a glycerol-phthalic acid condensation product ("glyptal" of acid value 150 and made as described below) are added. The "mix" so obtained is vulcanized at 140° for 30 minutes and then has a tensile strength of 195 kilog. per sq. cm. When, however, it is heated at 110° for 75 minutes the tensile strength is only 30 kilog. per sq. cm.

In the absence of the glycerol-phthalic acid condensation product the corresponding figures are 200 and 75 kilog. per sq. cm. respectively.

The "glyptal" used above is made as follows:—
148 parts by weight of phthalic anhydride and 62 parts by weight of glycerol are heated together in a vessel and the mixture stirred. The temperature is raised to and held at 175° C. During the early stages of the reaction there is a brisk evolution of water but as the action proceeds the rate of evolution of water diminishes, and the mixture thickens slightly. When the acid value has been reduced to 150 the product is poured off into tin trays and allowed to cool. It is then a pale straw-coloured hard transparent resin and is ground up for use.

It is thus seen that by our invention the liability to "scorch" is almost entirely suppressed. The accelerator used in the above illustrated example of our invention exhibits itself a so-called "delayed action". By the process of our invention even this remaining tendency to premature vulcanization is almost entirely avoided.

A further illustrative example is as follows:

Example II

To a rubber mix consisting of pale crepe 100 parts, zinc oxide 10 parts, barytes 75 parts, sulphur 2.5 parts, 2-mercapto-benzthiazole 0.25 parts, and diphenylguanidine 0.25 parts, 0.5 parts of a similar "glyptal" to that used in Example I but of acid value 126, it being more highly condensed, is added. The resulting mix is vulcanized at 140° C. for 30 minutes and then has a tensile strength of 220 kilos per sq. cm. When vulcanized for 45 minutes at 110° C. it has a tensile strength of only 61 kilos per sq. cm. but the corresponding figures for the mix in the absence of the "glyptal" are 221 and 108 kilos per sq. cm. respectively.

Tests which demonstrate more effectively the advantage resulting from our invention may also be made on the apparatus known as a "Recovery Plastometer". Thus samples from the above mix were heated for various times at 110° C. and the degree of "set up" measured on the plastometer. As cure proceeds the percentage recovery increases and it will be seen from the table below that the sample containing the "glyptal" does not set up until after 40 minutes heating at 110° C., while the sample without the glyptal resin sets up in 20 minutes.

It is thus seen that by this invention the liability to "scorch" is almost entirely suppressed without appreciably altering the time required to effect complete vulcanization at 140° C.

| Time of heating (mins. at 110° C.) | Percentage recovery | |
|---|---|---|
| | Sample without "glyptal" | Sample with "glyptal" |
| 10 | 9.7 | 13.1 |
| 20 | 50.7 | 9.7 |
| 30 | 85.5 | 13.5 |
| 40 | 86.5 | 72.0 |

In general, we prefer to employ an amount of "glyptal" equal to about 1% of the weight of the batch being milled, but this proportion may be varied according to the effect desired by the mill operator. Our invention possesses the desirable quality of inhibiting the scorching or low temperature vulcanization of the rubber while permitting the high temperature vulcanization to proceed at its maximum efficiency.

A further advantageous feature of our invention is that there is experienced no difficulty in milling the "glyptal" into the mix. However, the "glyptal" may be mixed with the accelerator prior to incorporation in the rubber, if desired.

Since many embodiments of this invention, differing widely in one or more respects, may be made without departing from the spirit of our invention, it is to be understood that we do not limit ourselves to the foregoing examples or description except as indicated in the following claims:

We claim:

1. A process of treating rubber and rubber-like substances to prevent premature vulcanization which comprises incorporating in the rubber or rubber-like substances before or during the milling operations an acid polyhydric-alcohol-polybasic-aromatic acid condensation product.

2. A process of treating rubber and rubber-like substances to prevent premature vulcanization which comprises incorporating in the rubber or rubber-like substances before or during the milling operations a condensation product of glycerol and phthalic acid or its anhydride which has an acid value of more than 30.

3. A process of treating rubber and rubber-like substances to prevent premature vulcanization which comprises incorporating in the rubber or rubber-like substances before or during the milling operations a condensation product of glycerol and phthalic acid or its anhydride which has an acid value of about 100-150.

4. In the art of vulcanizing rubber or rubber-like substances the step which comprises milling into the rubber or rubber-like substances prior to vulcanization an acid polyhydric-alcohol-polybasic-aromatic-acid condensation product.

5. A process as described in claim 4 wherein the acid polyhydric-alcohol-polybasic-acid condensation product is milled into the "mix" simultaneously with a vulcanization accelerator having a known tendency to scorch the rubber.

6. Vulcanized rubber or rubber-like substances produced by the process defined in claim 1.

7. Vulcanized rubber or rubber-like substances produced by the process defined in claim 2.

8. Vulcanized rubber or rubber-like substances produced by the process defined in claim 3.

9. Vulcanized rubber or rubber-like substances produced by the process defined in claim 4.

10. A process of treating rubber and rubber-like substances to prevent premature vulcanization which comprises incorporating in the rubber or rubber-like substances before or during the milling operations an acid polyhydric-alcohol-polybasic-aromatic acid condensation product which has an acid value of at least 30.

11. A process of treating rubber and rubber-like substances to prevent premature vulcanization which comprises incorporating in the rubber or rubber-like substances before or during the milling operations a condensation product of glycerol and phthalic acid or its anhydride which has an acid value of about 150.

12. A process of treating rubber and rubber-like substances to prevent premature vulcanization which comprises incorporating in the rubber or rubber-like substances before or during the milling operations a condensation product of glycerol and phthalic acid or its anhydride which has an acid value of about 126.

13. A process as described in claim 2 wherein the acid polyhydric-alcohol-polybasic-acid condensation product is milled into the "mix" simultaneously with a vulcanization accelerator having a known tendency to scorch the rubber.

14. A process as described in claim 3 wherein the acid polyhydric-alcohol-polybasic-acid condensation product is milled into the "mix" simultaneously with a vulcanization accelerator having a known tendency to scorch the rubber.

15. A process as described in claim 10 wherein the acid polyhydric-alcohol-polybasic-acid condensation product is milled into the "mix" simultaneously with a vulcanization accelerator having a known tendency to scorch the rubber.

16. A process as described in claim 11 wherein the acid polyhydric-alcohol-polybasic-acid condensation product is milled into the "mix" simultaneously with a vulcanization accelerator having a known tendency to scorch the rubber.

17. A process as described in claim 12 wherein the acid polyhydric-alcohol-polybasic-acid condensation product is milled into the "mix" simultaneously with a vulcanization accelerator having a known tendency to scorch the rubber.

18. Vulcanized rubber or rubber-like substances produced by the process defined in claim 10.

19. Vulcanized rubber or rubber-like substances produced by the process defined in claim 11.

20. Vulcanized rubber or rubber-like substances produced by the process defined in claim 12.

MALDWYN JONES.
WILLIAM JOHNSON SMITH NAUNTON.